US011848824B2

(12) United States Patent
Shenoy et al.

(10) Patent No.: US 11,848,824 B2
(45) Date of Patent: Dec. 19, 2023

(54) DISTRIBUTED AUTO DISCOVERY SERVICE

(71) Applicant: VMWARE, INC., Palo Alto, CA (US)

(72) Inventors: Pranav Ashok Shenoy, Bangalore (IN); Rohit Pradeep Shetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 61 days.

(21) Appl. No.: 17/503,455

(22) Filed: Oct. 18, 2021

(65) Prior Publication Data

US 2023/0025486 A1 Jan. 26, 2023

(30) Foreign Application Priority Data

Jul. 23, 2021 (IN) .............................. 202141033182

(51) Int. Cl.
| | |
|---|---|
| H04L 29/06 | (2006.01) |
| H04L 29/08 | (2006.01) |
| H04L 9/40 | (2022.01) |
| H04L 9/32 | (2006.01) |
| H04L 29/12 | (2006.01) |
| H04L 41/12 | (2022.01) |
| H04L 67/51 | (2022.01) |

(52) U.S. Cl.
CPC .......... *H04L 41/12* (2013.01); *H04L 63/0853* (2013.01); *H04L 67/51* (2022.05)

(58) Field of Classification Search
CPC ...... H04L 41/12; H04L 63/0853; H04L 67/51
See application file for complete search history.

(56) References Cited

U.S. PATENT DOCUMENTS

| | | | | |
|---|---|---|---|---|
| 6,564,261 | B1 * | 5/2003 | Gudjonsson | H04L 51/04 |
| | | | | 379/900 |
| 8,719,433 | B2 * | 5/2014 | Panasyuk | G06F 21/41 |
| | | | | 709/225 |
| 9,538,311 | B2 * | 1/2017 | Baum | H04L 63/0807 |
| 9,608,809 | B1 * | 3/2017 | Ghetti | H04L 9/0822 |
| 9,749,428 | B2 * | 8/2017 | Lawson | H04M 15/47 |
| 10,382,445 | B1 * | 8/2019 | Mantel | G06Q 20/3223 |
| 10,764,273 | B2 * | 9/2020 | Mohamad Abdul | |
| | | | | H04W 12/084 |
| 11,134,074 | B1 * | 9/2021 | Tandri | H04L 63/0823 |
| 11,184,231 | B1 * | 11/2021 | Brems | H04L 67/10 |
| 11,398,912 | B2 * | 7/2022 | Doyon | H04L 9/3247 |

(Continued)

*Primary Examiner* — Kevin T Bates
*Assistant Examiner* — Golam Mahmud
(74) *Attorney, Agent, or Firm* — Clayton, McKay & Bailey, PC

(57) ABSTRACT

Methods and systems are described for a distributed auto discovery service for device enrollment. In an example, a user device enrolling in a Unified Endpoint Management ("UEM") system can receive an email address. The enrolling user device can identify, on a local network that the enrolling user device is connected to, other user devices that are already enrolled with the UEM system. The unenrolled user device can send a discovery request to the enrolled user devices that includes the domain of the email address. One or more of the enrolled user devices can respond with a tenant identifier associated with the domain and a Uniform Resource Locator for a server that the unenrolled user device can contact to complete enrollment. The unenrolled user device can contact the server and complete enrollment using the email address and tenant identifier.

20 Claims, 4 Drawing Sheets

(56) References Cited

U.S. PATENT DOCUMENTS

| | | | | |
|---|---|---|---|---|
| 2012/0016863 A1* | 1/2012 | Bernhardt | ............... | G06F 16/35 |
| | | | | 707/E17.108 |
| 2013/0124525 A1* | 5/2013 | Anderson | ............. | G06F 16/278 |
| | | | | 707/737 |
| 2015/0026330 A1* | 1/2015 | Ahmed | ................... | G06F 21/73 |
| | | | | 709/224 |
| 2015/0222621 A1* | 8/2015 | Baum | ................. | H04L 63/0807 |
| | | | | 726/9 |
| 2015/0294431 A1* | 10/2015 | Fiorucci | ................ | G07B 15/02 |
| | | | | 705/13 |
| 2016/0352840 A1* | 12/2016 | Negron | ................ | H04L 63/083 |
| 2018/0145887 A1* | 5/2018 | Deane | ................. | H04L 41/5054 |
| 2019/0036934 A1* | 1/2019 | Pitchaimani | .......... | H04W 12/37 |
| 2021/0144213 A1* | 5/2021 | Momchilov | ........ | H04L 41/0894 |
| 2021/0192032 A1* | 6/2021 | Seroussi | ................ | G06N 3/045 |
| 2021/0320790 A1* | 10/2021 | Nishimura | ............ | H04L 9/0897 |
| 2021/0336966 A1* | 10/2021 | Gujarathi | .............. | H04L 9/3247 |
| 2021/0389959 A1* | 12/2021 | Jain | ....................... | G06F 9/4451 |
| 2022/0399995 A1* | 12/2022 | Moon | ................. | H04L 67/1044 |

* cited by examiner

# DISTRIBUTED AUTO DISCOVERY SERVICE

RELATED APPLICATION

Benefit is claimed under 35 U.S.C. 119(a)-(d) to Foreign Application Serial No. 202141033182 filed in India entitled "DISTRIBUTED AUTO DISCOVERY SERVICE", on Jul. 23, 2021, by VMware, Inc., which is herein incorporated in its entirety by reference for all purposes.

BACKGROUND

Enterprises often use device managements systems, such as a Unified Endpoint Management ("UEM") system, to secure and control certain aspects of user devices of employees. Some UEM providers allow client enterprises to enroll devices with just an email identifier ("ID") without needing to provide a uniform resource locator ("URL") for an enrollment server or a tenant ID associated with the client. For this type of enrollment, the client registers its domain with a global discovery service. Unenrolled devices contact a discovery server that hosts the global discovery service to retrieve the enrollment server URL and tenant ID associated with the client's domain. The unenrolled device then contacts the enrollment server to complete enrollment.

This global discovery method has various flaws and drawbacks. For example, the discovery server must always be running, increasing computing resource costs. Also, when one or more clients enroll a large number of devices at the same time, this can cause a major backlog that delays the enrollment process so that the user devices can retrieve the correct enrollment server URL and tenant ID. If the discovery server fails for any reason, then none of the clients for the UEM provider can enroll any new devices.

As a result, a need exists for providing an enrollment discovery service that is not dependent on a central server.

SUMMARY

Examples described herein include systems and methods for distributing an auto discovery service for enrolling user devices in a system that manages user devices, like a UEM system. In an example, a management application associated with the UEM system can be installed on a user device that a user is enrolling with the UEM system. The user can input an email address into the management application. In an example, the email address can be associated with a tenant ID of a client. For example, each client of a UEM provider can have one or more unique domains tied to the client's tenant ID. When a user enrolls a device, the user can provide an email address with a domain associated with the tenant ID. Devices that are enrolled can be configured to store the domain, tenant ID, and a URL of a server that handles enrollment of new devices.

In an example, an unenrolled user device can send a discovery request to devices connected to the same local network that the unenrolled user device is connected to. The discovery request can include a request for the tenant ID associated with the user's email domain and the URL of the enrollment server. In one example, for the management application to make or respond to a discovery request, the UEM system can require that the local network be a trusted network, like a secure corporate network. In one example, the unenrolled user device can first contact other devices on the network to find out which devices are enrolled user devices. In another example, the unenrolled user device can send the discovery request to a specific connection port that the enrolled user devices are configured to listen to. In an example, the discovery request can include the domain of the user's email address. The contacted enrolled user devices on the local network can verify that the domain corresponds to the tenant ID. If they do match, the enrolled user devices can respond with the tenant ID and enrollment server URL.

In one example, the unenrolled user device can receive multiple responses from enrolled user devices and compare them to ensure they match. For example, if the unenrolled user device receives 50 responses where 49 of the responses match but one does not, the unenrolled user device can know to trust the response from the matching 49 responses and discard the mismatching response. The unenrolled user device can then connect to the enrollment server to complete enrollment. This can include providing the tenant ID, the email address, and any required credentials to the enrollment server. In one example, after enrollment, the unenrolled user device can take on discovery responsibilities by responding to discovery requests from future unenrolled user devices.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Methods and systems are described for a distributed auto discovery service for device enrollment. In an example, a user enrolling a user device with a UEM system can input an email address into an unenrolled unenrolled user device. The enrolling user device can identify, on a local network that the unenrolled user device is connected to, other user devices that are already enrolled with the UEM system. The unenrolled user device can send a discovery request to the enrolled user devices that includes the domain of the email address. One or more of the enrolled user devices can respond with a tenant ID associated with the domain and a URL for a server that the unenrolled user device can contact to complete enrollment. The unenrolled user device can contact the server using the URL and send an enrollment request that includes the email address, the tenant ID, and any credentials and certificates required by the server. The server can complete enrollment of the unenrolled user device.

Figure 1:
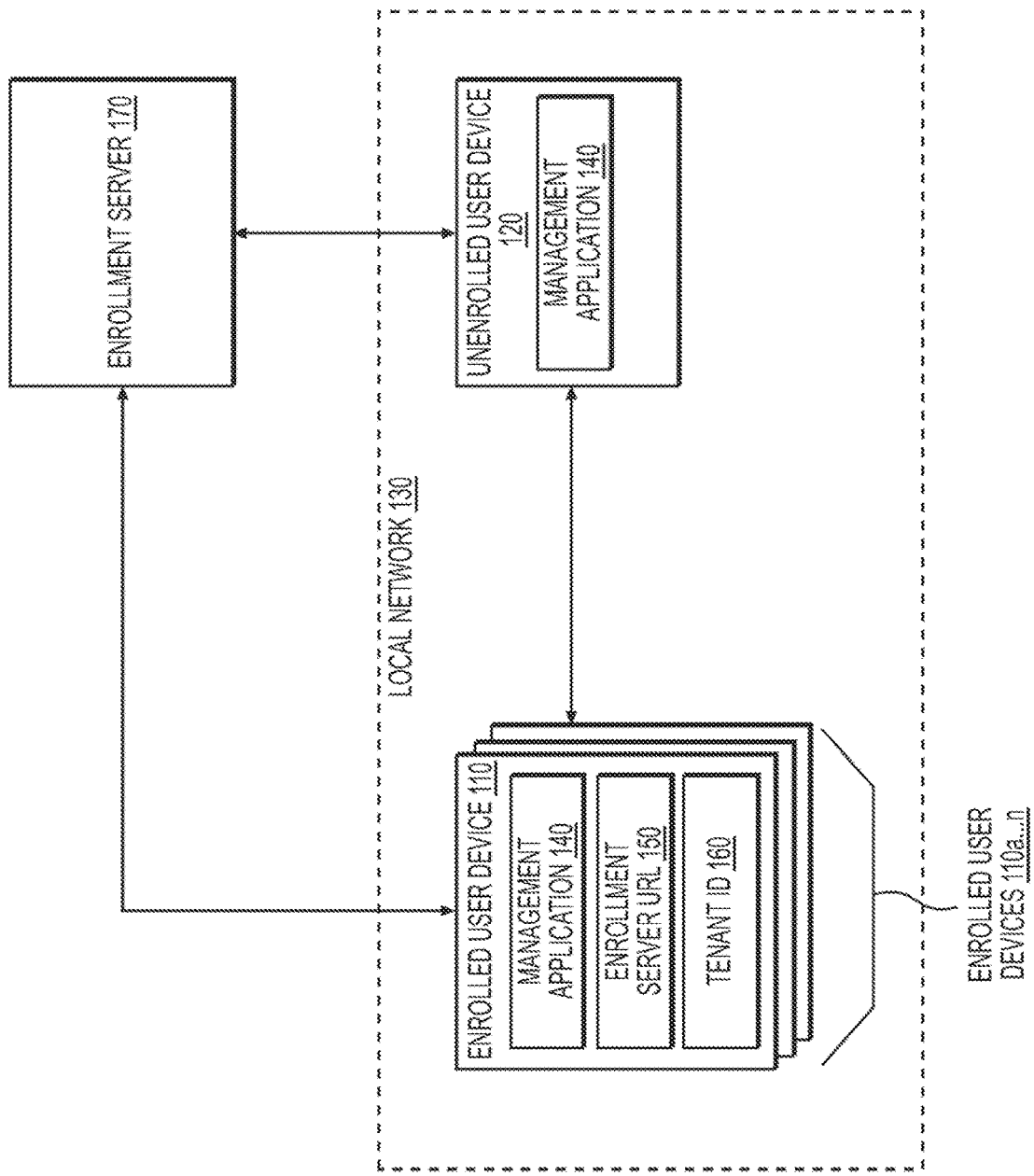
FIG. 1 is an illustration of an example system for distributing an auto discovery service.

FIG. 1 is an illustration of an example system for distributing an auto discovery service. Enrolled user devices ("enrolled devices") 110a . . . n and an unenrolled user device ("unenrolled device") 120 can be connected to a local network 130. The local network can include two or more devices connected to each other such that they can exchange electronic communications. For example, the local network can include a local area network ("LAN"), a wireless local area network ("WLAN"), a virtual private network ("VPN") internet connection, or two or more devices connected directly, such as through BLUETOOTH, WIFI DIRECT, or near-field communications ("NFC"). The network can include one or more nodes, such a routers or switches, that assign IP addresses to connect devices and route network traffic to and from the connect devices.

The enrolled devices 110a . . . n can be one or more processor-based devices, such as a personal computer, tablet, or cell phone, that is enrolled in a UEM system or other similar system that manages user devices for an organization. The enrolled devices 110a . . . n are referred to throughout as just the enrolled device or devices 110 and are meant to include one or more enrolled devices 110, depending on the example.

In an example, an enrollment server 170 can be a server that is responsible for enrolling user devices in the UEM system. The enrollment server 170 can be a single server or a group of servers, including multiple servers implemented virtually across multiple computing platforms. In an example, the enrollment server 170, or another server in the UEM system, can manage enrolled user devices 110 by sending management instructions to a management application 140 installed on the enrolled user devices 110. The management application 140 can be a stand-alone application, part of an enterprise application, or part of an operating system of the enrolled devices 110.

In an example, the management application 140 can be responsible for ensuring that the enrolled devices 110 are up to date with compliance and security settings prior to accessing enterprise data and resources. The management application 140 can communicate with the enrollment server 170, allowing UEM management of the enrolled devices 110 based on compliance and security settings at the enrollment server 170. The management application 140 can enforce compliance at the enrolled devices 110, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the enrolled devices 110 can access enterprise or UEM resources through the enrollment server 170.

In an example, the unenrolled device 120 can include one or more user devices that are not enrolled with a UEM or other similar system. The unenrolled device 120 can, however, enroll with the enrollment server 170 using methods described later herein. Enrolling can cause the unenrolled device 120 to be remotely administered by the UEM system. In one example, the enrollment process can include installing a management agent, such as the management application 140, and installing a management profile on the unenrolled device 110. Installing the management application 140 and the management profile can grant the UEM system administrative privileges over the unenrolled device 120.

In an example, the management application 140 on the unenrolled device 120 can be configured to retrieve enrollment discovery information from enrolled devices 110 on the local network 130. Enrollment discovery information (hereinafter referred to as just "discovery information") can include a network address, such as a URL 150, of a server that the unenrolled device 120 needs to contact to complete enrollment and a tenant ID 160 of an organization that the unenrolled device 120 belongs to. For example, a UEM service provider can service multiple client organizations, and each client can have a unique tenant ID 160 assigned to it. The tenant ID 160 of each client can be associated with an email domain that the client uses. When a user enrolls an unenrolled device 120, the management application 140 can prompt the user to enter an email address. The email address can be associated with a management profile of the user, and the domain of the email address can correspond to the user's organization. The management application 140 can be configured to cause the unenrolled device 120 to search for discovery information associated with the user's email domain.

In an example, the unenrolled device 120 can search for discovery information by sending a request with the email domain to enrolled devices 110 on the local network 130. For example, the unenrolled device 120 can retrieve the IP addresses of devices connected to the local network 130 from a network node of the local network 130, such as a router our switch. In one example, the management application 140 can be configured to cause the unenrolled device 120 to send the discovery request to a specific connection port that the enrolled devices 110 are configured to listen on. If the email domain matches the domain of the management profile on the enrolled device 110, then the management application 140 can cause the enrolled device 110 to respond to the request with the tenant ID 160 and enrollment server URL 150 associated with the domain. The unenrolled device 120 can contact the enrollment server 170 with the enrollment server URL 150 and provide the tenant ID 160 and user credentials to continue the enrollment process. The unenrolled device 120 can contact the enrollment server 170 using one of various network communication methods, such as by making a hypertext transfer protocol ("HTTP") request or an Application Programming Interface ("API") call.

In an example, the enrolled devices 120 can communicate with the UEM system through a pull system. For example, the enrollment server 170, or another server in the UEM system, can store a management record specific to each enrolled device 110. This management record can include commands, configuration files, applications, and other UEM resources associated with each enrolled device 110. When there is a new UEM resource for an enrolled device 110, the enrollment server 170 can add the UEM resource to a command queue for the enrolled device 110. The enrollment server 170 can then send a message to a notification server that causes the notification server to send a message to the enrolled device 110 to check in with the enrollment server 170. After receiving the message, the enrolled device 110 can send a message to the enrollment server 170 asking if there is anything the enrolled device 110 needs to retrieve. The enrollment server 170 can respond by serving the UEM resources from the command queue to the enrolled device 110. In one example, after enrollment is complete, the unenrolled device 120 can become an enrolled device 110 and assume discovery responsibilities for new unenrolled devices 120.

Figure 2:
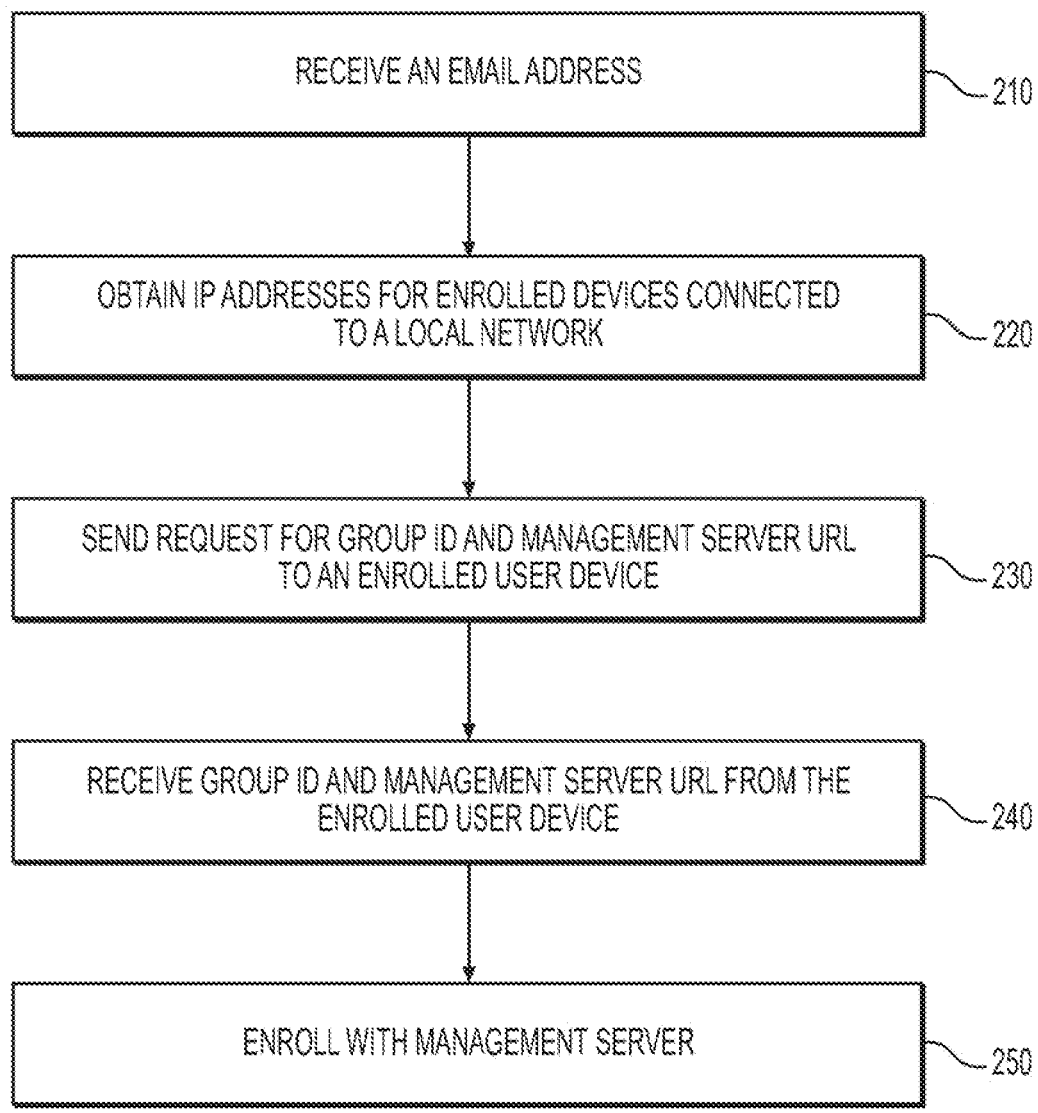
FIG. 2 is a flowchart of an example method for distributing an auto discovery service.

FIG. 2 is a flowchart of an example method for distributing an auto discovery service. In an example, the method can be implemented by a UEM system for enrolling user devices using other enrolled user devices as the auto discovery service. For example, a UEM provider can provide UEM services to various clients and assign a tenant ID 160 to each client. The UEM provider can provide an enrollment server 170 for each client that is responsible for enrolling and managing user devices for that client. User devices that are already enrolled with the client's enrollment server 170 already store information that an unenrolled device 120 needs to complete enrollment, such as the URL of the client's enrollment server 170 and the client's tenant ID 160. The example method below describes how an unenrolled device 120 can retrieve this information from the enrolled devices 110 so that it can complete the enrollment process with the enrollment server 170.

At stage 210, the unenrolled device 120 can receive an email address. The email address can be received from user input. For example, a user enrolling the unenrolled device 120 can install the management application 140. When the management application 140 loads, the management application 140 can prompt the user to provide credentials for enrolling the unenrolled device 120. For example, the management application 140 can display a prompt for the user to enter an email address and a password.

In an example, the domain of the user's email address can be associated with the client's tenant ID 160. For example, each client of a UEM provider can have one or more unique domains tied to the tenant ID 160. When a user enrolls a device, the user can provide an email address (or just the domain in some examples), and the domain of the email address can be used to determine the associated tenant ID 160 and which enrollment server 170 the unenrolled device needs to enroll with. This can be performed using the steps below.

At stage 220, the unenrolled device 120 can obtain local Internet Protocol ("IP") addresses of devices connected to the local network 130 for enrolled user devices 110. For example, the unenrolled device 120 can scan the local network 130 to retrieve all the IP addresses of discoverable devices connected to the local network 130. In one example, the enrolled devices 110 can be configured to be discoverable on the local network 130 to unenrolled devices like the unenrolled device 120. This can be a setting enforced by the enrollment server 170, in an example. In one example, stage 220 can occur as part of stage 230 below. For example, the unenrolled device 120 can scan IP addresses by making discovery requests on a specified connection port.

At stage 230, the unenrolled device 120 can send a discovery request to the enrolled devices 110 for the tenant ID 160 and the enrollment server URL 150. In an example, the tenant ID 160 can correspond to an organization that the unenrolled device 120 is enrolling with, and the enrollment server URL 150 can be the URL associated with the enrollment server 170 of the client.

The discovery request can be sent to one or multiple enrolled devices 110 on the local network 130. For example, the unenrolled device 120 can send the discovery request to all IP addresses obtained previously. In one example, the unenrolled device 120 can send the discovery request to a specific port that the management application 140 of the enrolled devices 110 is configured to listen to for such requests. Although the discovery request may be sent to other non-enrolled devices that are connected to the local network 130, only the enrolled devices 110 are configured to receive, interpret, and respond to the discovery request on that port. In an example, the specified port can be selected and enforced by the enrollment server 170.

Sending the discovery request to multiple devices on the local network 130 at the same time (i.e., in parallel) can help expedite a response. For example, this can avoid delays where one or more devices on the local network 130 fails to respond, such as when the IP address is not associated with an enrolled device 110. The unenrolled device 120 can send the discovery request to all the IP addresses and use the first response received.

In an example, the domain of the email address, or the entire email address, can be embedded in the discovery request. For example, the management application 140 on the unenrolled device 120 can extract the domain from the email address and embed it in the discovery request. The enrolled devices 110 that receive the discovery request can check the domain to determine if it matches the domain corresponding to a tenant ID 160 that they are enrolled under. For example, each enrolled devices 110 can determine whether the domain in the discovery request matches the domain of the user profile that is currently logged in to the enrolled device 110. If the domain does not match, then the enrolled devices 110 can simply ignore the discovery request.

Where the domain does match, the method can continue to stage 240 where the unenrolled device 120 can receive the tenant ID 160 and the enrollment server URL 150 from the enrolled user device 110. Again, the unenrolled device 120 can receive the tenant ID 160 and the enrollment server URL 150 from one or multiple enrolled user devices 110.

In one example, the management application 140 on the unenrolled device 120 can require that it receive multiple responses for security reasons. For example, if the unenrolled device 120 accepts the first response, the unenrolled device 120 can be provided with false information if the first device to respond is a malicious device. To help prevent this, the management application 140 can be required to receive a predetermined number of responses, such as 10 or 20, and compare the responses to ensure they match. The greater number of matched responses increases the likelihood that the information provided in those responses is correct. In an example, the management application 140 can discard any anomalies in the responses. For example, if 49 responses match and one does not, the management application 140 can discard that one mismatch and use the information from the 49 responses. In an example, where an insufficient threshold percentage of responses match, the management application 140 can be configured to stop the enrollment process to prevent any malicious attacks.

In an example, the enrollment server 170 can assign a set of enrolled devices 110 to respond to requests from unenrolled devices 120. For example, in an environment with hundreds of enrolled devices, the enrollment server 170 can select a set of them to respond to discovery requests, such as 10, 20, or 50. In one example, where one of the selected devices becomes unreachable, the enrollment server 170 can select another enrolled device 110 to take its place. In another example, the enrollment server 170 can periodically change which devices are selected for auto-discovery. In an example, the selected devices can enable a connection port for auto-discovery, while the non-selected devices can disable the connection port. The management application 140 on the unenrolled device 120 can be configured to send discovery requests to the connection port, so only the selected devices with the port enabled will received it and respond.

In an example, the enrollment server 170 can choose the enrolled devices 110 used for discovery based on the device posture of the enrolled devices 110 connected to the local network 130. Device posture can indicate how secure a device is. For example, the enrollment server 170 can collect security-related data from the enrolled devices 110 that can be gathered by the management application 140. The security-related data can include an operating system ("OS") version, storage encryption, antivirus status, status of security updates installed, detection of any malicious applications or services, and so on. In one example, the enrollment server 170 can score the enrolled device 110 based on their security posture. The enrollment server 170 can then select enrolled devices 110 with the highest posture scores to provide discovery services to unenrolled devices 120. For example, the enrollment server 170 can select the 10 highest scoring enrolled devices 110, or the enrollment server 170 can select all enrolled devices 110 that have a posture score higher than a predetermined threshold.

In an example, the discovery request by the unenrolled device 120 and the response from the enrolled devices 110 can be encrypted. For example, the installation file for the management application 140 can include a symmetric encryption key. After the user installs the management application 140 and provides the email address, the unenrolled device 120 can encrypt the discovery request with the encryption key, which can then only be decrypted by enrolled user devices 110 that also have the management application 140 installed and therefore possess the encryption key. The enrolled devices 110 can then encrypt their responses using the same key so that it can be decrypted by the unenrolled device 120.

At stage 250, the unenrolled device 120 can complete enrollment with the enrollment server 170. For example, the unenrolled device 120 can send an enrollment request to the enrollment server 170 using the enrollment server URL. The enrollment request can include the tenant ID 160. The enrollment server 170 can authenticate the user's credentials and verify that the domain matches the tenant ID 160. The enrollment server 170 can then send a configuration profile to the unenrolled device 120 that includes security and compliance settings for the unenrolled device 120. In one example, the unenrolled device 120 can save the enrollment server URL 150 and tenant ID 160 so that it can provide them to future unenrolled devices 120.

Figure 3:
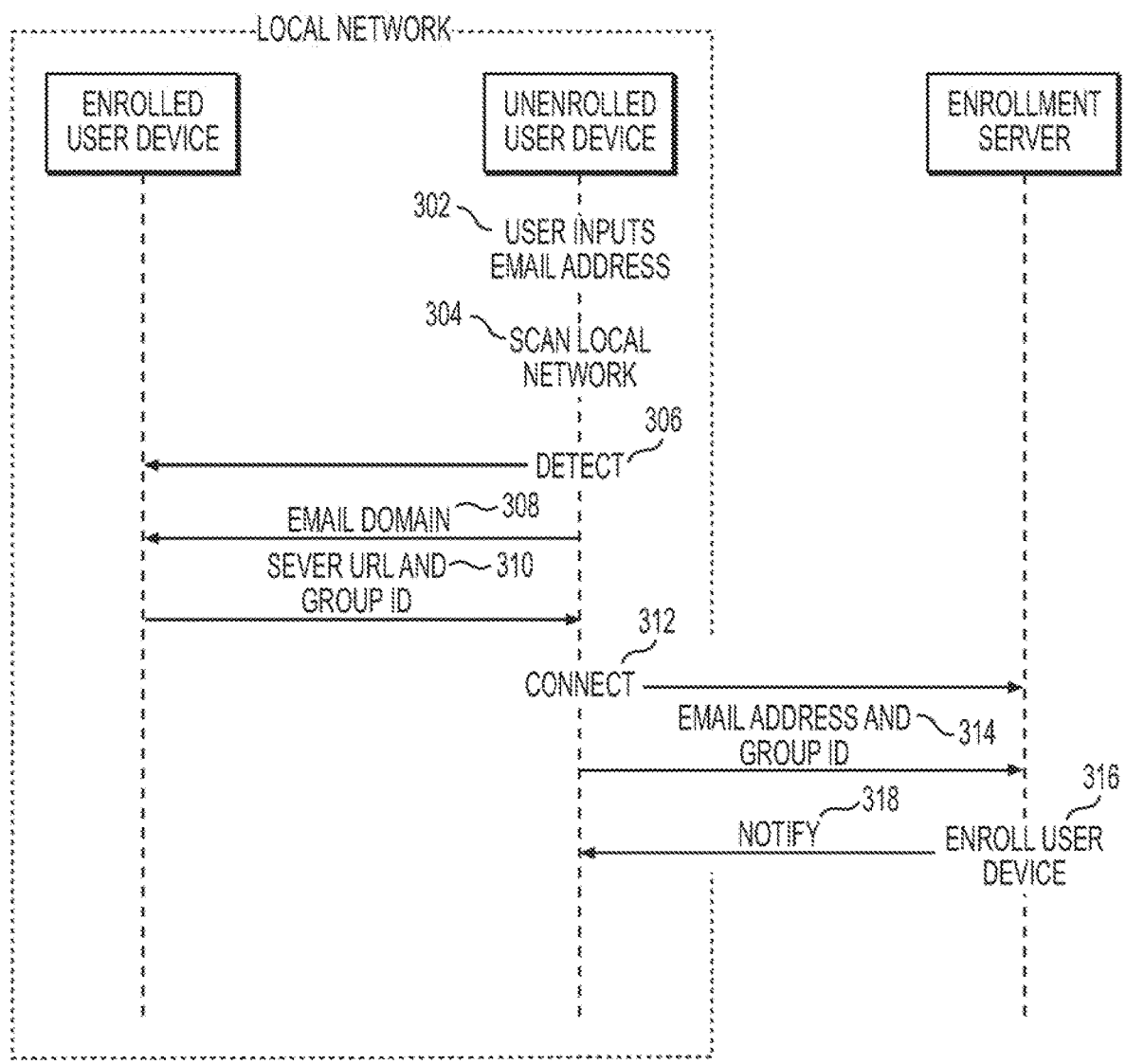
FIG. 3 is a sequence diagram of an example method for distributing an auto discovery service.

FIG. 3 is a sequence diagram of an example method for distributing an auto discovery service. At stage 302, the user can input an email address into the unenrolled device 130. For example, a user enrolling the unenrolled device 120 can install the management application 140. When the management application 140 loads, the management application 140 can prompt the user to provide credentials for enrolling the unenrolled device 120. For example, the management application 140 can display a prompt for the user to enter an email address and a password.

In an example, the domain of the user's email address can be associated with the client's tenant ID 160. For example, each client of a UEM provider can have one or more unique domains tied to the tenant ID 160. When a user enrolls a device, the user can provide an email address (or just the domain in some examples), and the domain of the email address can be used to determine the associated tenant ID 160 and which enrollment server 170 the unenrolled device needs to enroll with. This can be performed using the steps below.

At stage 304, the unenrolled device 120 can scan the local network 130 for enrolled user devices. For example, the unenrolled device 120 can obtain IP addresses of discoverable devices on the local network 130. In one example, the enrolled devices 110 can be configured to be discoverable on the local network 130 to unenrolled devices like the unenrolled device 120. This can be a setting enforced by the enrollment server 170, in an example.

At stage 306, the unenrolled device 120 can detect the enrolled device 110. The unenrolled device 120 can detect one or more enrolled devices 110, depending on the example. For example, the management application 140 on the unenrolled device 120 can be configured to ping devices on the local network 130 on a specific connection port. The enrolled devices 110 can be configured to listen for a ping from unenrolled devices 120 on that connection port and respond to the unenrolled device 120.

In another example, the management application 140 can include an encryption key used to encrypt data communications, such as a symmetric or asymmetric key. The management application 140 can create a discovery request, encrypt the discovery request, and send it to all the IP addresses it received on a specific connection port. In an example, the discovery request can include a certificate or key that the enrolled devices 110 are configured to listen for on the connection port. Each enrolled device 110 can decrypt the discovery request and determine whether the email domain matches to the tenant ID 160 that the enrolled device 110 is enrolled under. If there is a match, then the enrolled device 110 can respond to the unenrolled device 120.

At stage 308, the unenrolled device 120 can send the domain of the user's email address to the enrolled user device 110. This can occur after detecting the enrolled device 110 or as part of the detection stage, depending on the example. For example, the unenrolled device 120 can send the domain with an encrypted discovery request that it sends to all devices on the local network, or the unenrolled device 120 can first detect the enrolled device 110 and then send the domain with the discovery request.

At stage 310, the enrolled device 110 can send the enrollment server URL 150 and the tenant ID 160 to the unenrolled device 120. For example, the enrolled devices 110 can be enrolled using email address associated with their respective users. The domain of each email address can correspond to a tenant ID 160 of an organization or client. In one example, multiple domains can correspond to a single tenant ID 160. After enrolling, the enrolled devices 110 can locally store the enrollment server URL 150 and tenant ID 160 associated with the email domain. When an enrolled device 110 receives a discovery request from an unenrolled device 120, the enrolled device 110 can first determine whether the domain of the unenrolled device 120 matches the domain of the enrolled device 110, or at least is associated with the same tenant ID 160. If so, the enrolled device 110 can respond to the unenrolled device 120 with the corresponding enrollment server URL 150 and tenant ID 160 over the local network 130.

At stage 312, the unenrolled device 120 can connect to the enrollment server 170 using the enrollment server URL. For example, the unenrolled device 120 can make a HTTP request using the enrollment server URL. At stage 314, the unenrolled device 120 can send the user's email address and the tenant ID 160 to the enrollment server 170. In one example, the unenrolled device 120 can also send any credentials provided by the user, such as a password or personal identification number ("PIN").

At stage 316, the enrollment server 170 can complete enrollment of the unenrolled device 120. For example, the enrollment server 170 can authenticate the unenrolled device 120 using the email address and any credentials provided by the user. In one example, the enrollment server 170 can verify that the tenant ID 160 matches the domain of the user's email address and is associated with the enrollment server 170. For example, a UEM service provider can configure one or more enrollment servers 170 for each client. Each enrollment server 170 can be associated with one or more tenant IDs 160 corresponding to a particular client. When a user enrolls a device, the enrollment server 170 can ensure that the domain of the user's email and the tenant ID 160 match each other and correspond to the tenant ID 160 associated with the enrollment server 170. This can help ensure that unenrolled devices 120 do not enroll with the wrong server.

In an example, after authenticating the unenrolled device 120, the enrollment server 170 can configure security and compliance settings at the unenrolled device 120 as part of the enrollment process. For example, the enrollment server 170 can send a profile payload to the management application 140 on the unenrolled device 120. The profile payload can include security and compliance settings that the management application 140 can install on the unenrolled device 120. In one example, the enrollment server 170 can also send installation files for applications associated with the user's profile that the management application 140 can install.

At stage 318, the enrollment server 170 can notify the unenrolled device 120 that enrollment is complete. In one example, after the unenrolled device 120 has completed enrollment, the unenrolled device 120 can take on enrollment discovery services of the enrolled devices 110. For example, when another user attempts to enroll and new unenrolled device 120 on the local network 130, the now enrolled unenrolled device 120 can provide the enrollment server URL 150 and tenant ID 160. This eliminates any need for a global auto discovery server that unenrolled devices 120 must connect to for receiving enrollment information.

Figure 4:
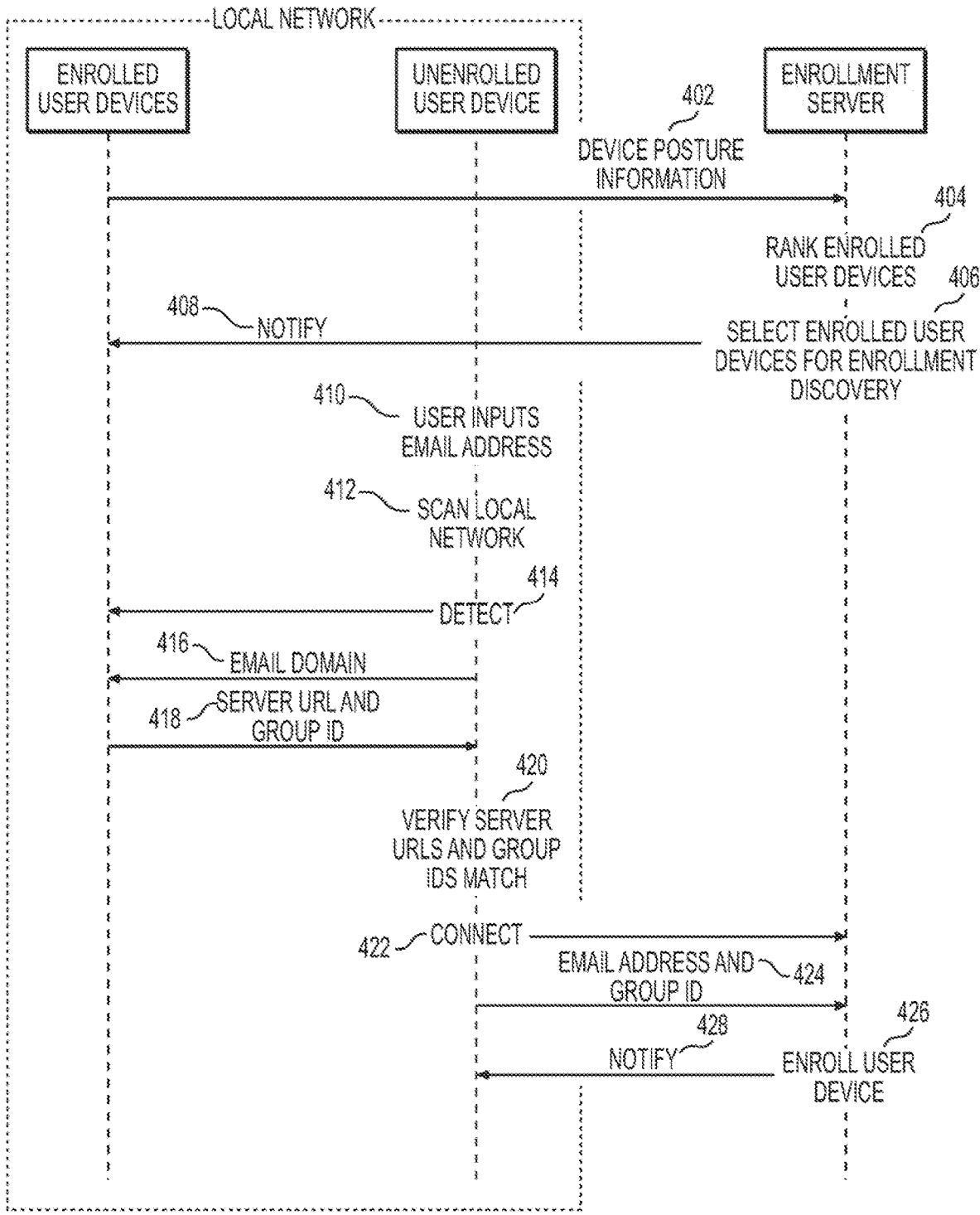
FIG. 4 is a sequence diagram of another example method for distributing an auto discovery service.

FIG. 4 is a sequence diagram of a second example method for distributing an auto discovery service. At stage 402, the enrolled devices 110 can send device posture information to the enrollment server 170. Device posture information can indicate how secure a device is. For example, the management agent 140 (or another agent on the enrolled user device 110) can collect security-related data on the enrolled devices 110 and send the information to the enrollment server 170. The security-related data can include an OS version, storage encryption, antivirus status, status of security updates installed, detection of any malicious applications or services, and so on.

At stage 404, the enrollment server 170 can rank the enrolled devices 110 based on their device posture. For example, the enrollment server 170 can assign weights to device posture categories and calculate a score for each category. The enrollment server 170 can sum the category scores to get the device posture score for an enrolled device 110. The enrollment server 170 can create an ordered list of the enrolled devices 110 based on their scores.

At stage 406, the enrollment server 170 can select a set of enrolled devices 110 for enrollment discovery. In one example, the enrollment server 170 can select a predetermined number of enrolled devices 110 with the highest scores. For example, the enrollment server 170 can select the 10 or 20 highest scoring enrolled devices 110. In another example, the enrollment server 170 can select all enrolled devices 110 that have a posture score higher than a predetermined threshold. For example, the enrollment server 170 can select all enrolled devices 170 with a score of at least 50, regardless of how many enrolled devices 110 qualify.

At stage 408, the enrollment server 170 can notify the enrolled devices 110 of which enrolled devices 110 were selected for enrollment discovery. For example, the enrollment server 170 can notify the management application 140 of each enrolled device 110 whether the enrolled device 110 has been selected. In one example, the enrollment server 170 can send instructions to the selected enrolled devices 110 to listen on a particular connection port for discovery requests from unenrolled devices 120.

At stage 410, the user can input an email address into the unenrolled device 130. For example, a user enrolling the unenrolled device 120 can install the management application 140. When the management application 140 loads, the management application 140 can prompt the user to provide credentials for enrolling the unenrolled device 120. For example, the management application 140 can display a prompt for the user to enter an email address and a password.

In an example, the domain of the user's email address can be associated with the client's tenant ID 160. For example, each client of a UEM provider can have one or more unique domains tied to the tenant ID 160. When a user enrolls a device, the user can provide an email address (or just the domain in some examples), and the domain of the email address can be used to determine the associated tenant ID 160 and which enrollment server 170 the unenrolled device needs to enroll with. This can be performed using the steps below.

At stage 412, the unenrolled device 120 can scan the local network 130 for enrolled user devices. For example, the unenrolled device 120 can obtain IP addresses of discoverable devices on the local network 130. In one example, the enrolled devices 110 can be configured to be discoverable on the local network 130 to unenrolled devices like the unenrolled device 120. This can be a setting enforced by the enrollment server 170, in an example.

At stage 414, the unenrolled device 120 can detect the enrolled devices 110. The unenrolled device 120 can detect one or more enrolled devices 110, depending on the example. For example, the management application 140 on the unenrolled device 120 can be configured to ping devices on the local network 130 on the connection port that the enrollment server 170 instructed the selected enrolled devices 110 to listen on.

In another example, the management application 140 can include an encryption key used to encrypt data communications, such as a symmetric or asymmetric key. The management application 140 can create a discovery request, encrypt the discovery request, and send it to all the IP addresses it received on a specific connection port. In an example, the discovery request can include a certificate or key that the enrolled devices 110 are configured to listen for on the connection port. Each enrolled device 110 that receives the discovery request can decrypt the discovery request and determine whether the email domain matches to the tenant ID 160 that the enrolled device 110 is enrolled under. If there is a match, then the enrolled devices 110 can respond to the unenrolled device 120.

At stage 416, the unenrolled device 120 can send the domain of the user's email address to the enrolled devices 110. This can occur after detecting the enrolled devices 110 or as part of the detection stage, depending on the example. For example, the unenrolled device 120 can send the domain with a discovery request that it sends to all devices on the local network, or the unenrolled device 120 can first detect the enrolled devices 110 and then send the domain with the discovery request to the detected enrolled devices 110.

At stage 418, the enrolled devices 110 can send the enrollment server URL 150 and the tenant ID 160 to the unenrolled device 120. For example, the enrolled devices 110 can be enrolled using email address associated with their respective users. The domain of each email address can correspond to a tenant ID 160 of an organization or client. In one example, multiple domains can correspond to a single tenant ID 160. After enrolling, the enrolled devices 110 can locally store the enrollment server URL 150 and tenant ID 160 associated with the email domain. When an enrolled device 110 receives a discovery request from an unenrolled device 120, the enrolled device 110 can first determine whether the domain of the unenrolled device 120 matches the domain of the enrolled device 110, or at least is associated with the same tenant ID 160. If so, the enrolled device 110 can respond to the unenrolled device 120 with the corresponding enrollment server URL 150 and tenant ID 160 over the local network 130.

In an example, enrolled devices 110 that were not selected by the enrollment server 170 can ignore the discovery request, and therefore not send the enrollment server URL 150 and tenant ID 160 to the unenrolled device 120. For example, the unselected enrolled devices 110 can be configured not to listen for discovery requests on the connection port. The unenrolled device 120 can then only receive responses from the selected enrolled device 110. In one example, the enrollment server 170 can periodically change which enrolled devices 110 are selected for discovery.

In one example, the responses at stage 418 can act as the detection at stage 414.

At stage 420, the unenrolled device 120 can verify that the received enrollment server URLs 150 and the tenant IDs 160 match. For example, the unenrolled device 120 can determine whether it received the same enrollment server URL 150 and tenant ID 160 from all the responses. This can help ensure that the unenrolled device 120 uses the correct enrollment server URL 150 and tenant ID 160. For example, the unenrolled device 120 can discard any anomalies in the responses. As an example, if 49 responses match and one does not, the unenrolled device 120 can discard the one mismatch and use the matching information from the 49 responses. In one example, where an insufficient threshold percentage of responses match, the unenrolled device 120 can be configured to stop the enrollment process to prevent any malicious attacks. As an example, the unenrolled device 120 can discard the responses if less than 90% of the responses match.

At stage 422, the unenrolled device 120 can connect to the enrollment server 170 using the enrollment server URL. For example, the unenrolled device 120 can make a HTTP request using the enrollment server URL. At stage 424, the unenrolled device 120 can send the user's email address and the tenant ID 160 to the enrollment server 170. In one example, the unenrolled device 120 can also send any credentials provided by the user, such as a password or PIN.

At stage 426, the enrollment server 170 can complete enrollment of the unenrolled device 120. For example, the enrollment server 170 can authenticate the unenrolled device 120 using the email address and any credentials provided by the user. In one example, the enrollment server 170 can verify that the tenant ID 160 matches the domain of the user's email address and is associated with the enrollment server 170. For example, a UEM service provider can configure one or more enrollment servers 170 for each client. Each enrollment server 170 can be associated with one or more tenant IDs 160 corresponding to a particular client. When a user enrolls a device, the enrollment server 170 can ensure that the domain of the user's email and the tenant ID 160 match each other and correspond to the tenant ID 160 associated with the enrollment server 170. This can help ensure that unenrolled devices 120 do not enroll with the wrong server. Enrollment can include installing applications or applying settings configurations specified at the management server for the user, a group that the user belongs to, and/or for the tenant ID.

At stage 428, the enrollment server 170 can notify the unenrolled device 120 that enrollment is complete. In one example, after the unenrolled device 120 has completed enrollment, the unenrolled device 120 can take on enrollment discovery services of the enrolled devices 110. For example, when another user attempts to enroll and new unenrolled device 120 on the local network 130, the now enrolled unenrolled device 120 can provide the enrollment server URL 150 and tenant ID 160. This eliminates any need for a global auto discovery server that unenrolled devices 120 must connect to for receiving enrollment information.

In an example, after authenticating the unenrolled device 120, the enrollment server 170 can configure security and compliance settings at the unenrolled device 120 as part of the enrollment process. For example, the enrollment server 170 can send a profile payload to the management application 140 on the unenrolled device 120. The profile payload can include security and compliance settings that the management application 140 can install on the unenrolled device 120. In one example, the enrollment server 170 can also send installation files for applications associated with the user's profile that the management application 140 can install.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for distributing an auto discovery service in a Unified Endpoint Management ("UEM") system, comprising:

receiving, at an unenrolled user device that is not enrolled with the UEM system, an email address;

determining, by the unenrolled user device, a network address for at least a first enrolled user device on a local network that the unenrolled user device is connected to;

prior to sending an enrollment request to an enrollment server, sending, by the unenrolled user device to the first enrolled user device, a discovery request, wherein the discovery request includes a request for a tenant identifier ("ID") and a Uniform Resource Locator ("URL") of the enrollment server associated with a domain of the email address;

receiving, by the unenrolled user device from the first enrolled user device, the tenant ID and the enrollment server URL; and sending, by the unenrolled user device, an enrollment request to the enrollment server using the enrollment server URL, wherein the enrollment request includes the tenant ID and wherein enrollment grants administrative access of the unenrolled user device to the UEM system.

2. The method of claim 1, the method further comprising:
determining, by the unenrolled user device, a network address of a second enrolled user device connected to the local network;
sending, by the unenrolled user device and to the second enrolled user device, the discovery request;
receiving, by the unenrolled user device and from the second enrolled user device; the tenant ID and the enrollment server URL; and
prior to sending the enrollment request, verifying, by the unenrolled user device, that the tenant IDs and enrollment server URLs received from the first and second enrolled user devices match.

3. The method of claim 1, wherein the unenrolled user device receives the tenant ID and the enrollment server URL from the first enrolled user device over Wi-Fi, Bluetooth, or Near-Field Communication.

4. The method of claim 1, wherein the unenrolled user device sends the discovery request to a predetermined connect port on which the first enrolled user device is configured to listen for discovery requests.

5. The method of claim 1, wherein the discovery request includes the domain of the email address, and wherein the tenant ID and the enrollment server URL provided by the first enrolled user device are based on the domain.

6. The method of claim 1, wherein the first enrolled device is connected to the local network using a virtual private network connection.

7. The method of claim 1, wherein the unenrolled user device waits to receive a predetermined minimum number of matching responses from enrolled user devices before sending an enrollment request to the enrollment server.

8. A non-transitory, computer-readable medium containing instructions that, when executed by a hardware-based processor, performs stages for distributing an auto discovery service in a Unified Endpoint Management ("UEM") system, the stages comprising:
receiving, at an unenrolled user device that is not enrolled with the UEM system, an email address;
determining, by the unenrolled user device, a network address for at least a first enrolled user device on a local network that the unenrolled user device is connected to;
prior to sending an enrollment request to an enrollment server, sending, by the unenrolled user device to the first enrolled user device, a discovery request, wherein the discovery request includes a request for a tenant identifier ("ID") and a Uniform Resource Locator ("URL") of the enrollment server associated with a domain on the email address;
receiving, by the unenrolled user device from the first enrolled user device, the tenant ID and the enrollment server URL; and
sending, by the unenrolled user device, an enrollment request to the enrollment server using the enrollment server URL, wherein the enrollment request includes the tenant ID and wherein enrollment grants administrative access of the unenrolled user device to the UEM system.

9. The non-transitory, computer-readable medium of claim 8, the stages further comprising:
determining, by the unenrolled user device, a network address of a second enrolled user device connected to the local network;
sending, by the unenrolled user device and to the second enrolled user device, the discovery request;
receiving, by the unenrolled user device and from the second enrolled user device; the tenant ID and the enrollment server URL; and
prior to sending the enrollment request, verifying, by the unenrolled user device, that the tenant IDs and enrollment server URLs received from the first and second enrolled user devices match.

10. The non-transitory, computer-readable medium of claim 8, wherein the unenrolled user device receives the tenant ID and the enrollment server URL from the first enrolled user device over Wi-Fi, Bluetooth, or Near-Field Communication.

11. The non-transitory, computer-readable medium of claim 8, wherein the unenrolled user device sends the discovery request to a predetermined connect port on which the first enrolled user device is configured to listen for discovery requests.

12. The non-transitory, computer-readable medium of claim 8, wherein the discovery request includes the domain of the email address, and wherein the tenant ID and the enrollment server URL provided by the first enrolled user device are based on the domain.

13. The non-transitory, computer-readable medium of claim 8, wherein the first enrolled device is connected to the local network using a virtual private network connection.

14. The non-transitory, computer-readable medium of claim 8, wherein the unenrolled user device waits to receive a predetermined minimum number of matching responses from enrolled user devices before sending an enrollment request to the enrollment server.

15. A system for distributing an auto discovery service in a Unified Endpoint Management ("UEM") system, comprising:
a memory storage including a non-transitory, computer-readable medium comprising instructions; and
a computing device including a hardware-based processor that executes the instructions to carry out stages comprising:
receiving, at an unenrolled user device that is not enrolled with the UEM system, an email address from a user;
determining, by the unenrolled user device, a network address for at least a first enrolled user device on a local network that the unenrolled user device is connected to;
prior to sending an enrollment request to an enrollment server, sending, by the unenrolled user device to the first enrolled user device, a discovery request, wherein the discovery request includes a request for a tenant identifier ("ID") and a Uniform Resource Locator ("URL") of the enrollment server associated with a domain on the email address;
receiving, by the unenrolled user device from the first enrolled user device, the tenant ID and the enrollment server URL; and
sending, by the unenrolled user device, an enrollment request to the enrollment server using the enrollment server URL, wherein the enrollment request includes the tenant ID and wherein enrollment grants administrative access of the unenrolled user device to the UEM system.

16. The system of claim 15, the stages further comprising:
determining, by the unenrolled user device, a network address of a second enrolled user device connected to the local network;

sending, by the unenrolled user device and to the second enrolled user device, the discovery request;

receiving, by the unenrolled user device and from the second enrolled user device; the tenant ID and the enrollment server URL; and prior to sending the enrollment request, verifying, by the unenrolled user device, that the tenant IDs and enrollment server URLs received from the first and second enrolled user devices match.

17. The system of claim 15, wherein the unenrolled user device receives the tenant ID and the enrollment server URL from the first enrolled user device over Wi-Fi, Bluetooth, or Near-Field Communication.

18. The system of claim 15, wherein the unenrolled user device sends the discovery request to a predetermined connect port on which the first enrolled user device is configured to listen for discovery requests.

19. The system of claim 15, wherein the discovery request includes the domain of the email address, and wherein the tenant ID and the enrollment server URL provided by the first enrolled user device are based on the domain.

20. The system of claim 15, wherein the first enrolled device is connected to the local network using a virtual private network connection.

* * * * *